(12) United States Patent
Gilmutdinov et al.

(10) Patent No.: US 10,602,144 B2
(45) Date of Patent: Mar. 24, 2020

(54) METHOD FOR COMPRESSING DATA AND DISPLAY DEVICE USING THE SAME

(71) Applicants: LG DISPLAY CO., LTD., Seoul (KR); SAINT-PETERSBURG STATE UNIVERSITY OF AEROSPACE INSTRUMENTATION, St. Petersburg (RU)

(72) Inventors: Marat Gilmutdinov, Saint Petersburg (RU); Euiyeol Oh, Seoul (KR); Chulkwon Lee, Goyang-si (KR); Nickolay Egorov, Saint Petersburg (RU)

(73) Assignees: LG DISPLAY CO., LTD., Seoul (KR); SAINT-PETERSBURG STATE UNIVERSITY OF AEROSPACE INSTRUMENTATION, St. Petersburg (RU)

( * ) Notice: Subject to any disclaimer, the term of this patent is extended or adjusted under 35 U.S.C. 154(b) by 86 days.

(21) Appl. No.: 15/404,975

(22) Filed: Jan. 12, 2017

(65) Prior Publication Data

US 2017/0347098 A1 Nov. 30, 2017

(30) Foreign Application Priority Data

May 31, 2016 (KR) ........................ 10-2016-0067224

(51) Int. Cl.
*H04N 7/12* (2006.01)
*H04N 11/02* (2006.01)
(Continued)

(52) U.S. Cl.
CPC ......... *H04N 19/124* (2014.11); *G09G 3/3233* (2013.01); *H04N 19/136* (2014.11);
(Continued)

(58) Field of Classification Search
None
See application file for complete search history.

(56) References Cited

U.S. PATENT DOCUMENTS

| 5,805,914 A * | 9/1998 | Wise | G06F 15/00 |
|---|---|---|---|
| | | | 382/232 |
| 2004/0151253 A1 * | 8/2004 | Bossen | G06T 9/007 |
| | | | 375/243 |

(Continued)

FOREIGN PATENT DOCUMENTS

| CN | 1650328 A | 8/2005 |
|---|---|---|
| CN | 101714327 A | 5/2010 |

(Continued)

*Primary Examiner* — Chikaodili E Anyikire
(74) *Attorney, Agent, or Firm* — Dentons US LLP

(57) ABSTRACT

The present disclosure relates a method for compressing data and a display device using the same, which firstly generates a quantization grid to which a quantization step value is assigned at positions thereon corresponding to positions of the plurality of pixels, assigns the quantization step value using a preset quantization parameter and a quantization function determined according to a dimension of an array, and quantizes data, which is assigned to a pixel located at a position corresponding to a position of the quantization step value, using the quantization step value when the quantization step value is assigned.

As such, in accordance with the present disclosure, it may prevent a data loss due to compression of data from being concentrated on pixels located at specific concentrated positions. That is, in accordance with the present disclosure, a data loss due to quantization may be spatially distributed.

10 Claims, 18 Drawing Sheets

(51) Int. Cl.
  *H04N 11/04* (2006.01)
  *H04N 19/124* (2014.01)
  *G09G 3/3233* (2016.01)
  *H04N 19/136* (2014.01)
  *H04N 19/182* (2014.01)
(52) U.S. Cl.
  CPC ... *H04N 19/182* (2014.11); *G09G 2320/0285* (2013.01); *G09G 2320/043* (2013.01); *G09G 2340/0428* (2013.01)

(56) References Cited

U.S. PATENT DOCUMENTS

| | | |
|---|---|---|
| 2008/0068293 A1 | 3/2008 | Ishii |
| 2009/0040414 A1* | 2/2009 | Kawachi .............. G09G 3/2011 349/48 |
| 2009/0147843 A1* | 6/2009 | Han ..................... H04N 19/176 375/240.03 |
| 2009/0257664 A1* | 10/2009 | Kao ..................... H04N 19/159 382/232 |
| 2011/0116723 A1* | 5/2011 | Rasmusson ............. G06T 9/004 382/238 |
| 2012/0121012 A1* | 5/2012 | Shiodera .............. H04N 19/176 375/240.03 |
| 2013/0272390 A1* | 10/2013 | Joshi .................... H04N 19/176 375/240.03 |
| 2015/0187328 A1 | 7/2015 | Kim et al. |
| 2015/0356899 A1* | 12/2015 | Yamanaka ........... G09G 3/3225 345/690 |

FOREIGN PATENT DOCUMENTS

| | | |
|---|---|---|
| CN | 102123276 A | 7/2011 |
| CN | 104751794 A | 7/2015 |
| CN | 104919517 A | 9/2015 |
| CN | 105304020 A | 2/2016 |
| KR | 1020160010163 A | 1/2016 |

* cited by examiner

METHOD FOR COMPRESSING DATA AND DISPLAY DEVICE USING THE SAME

CROSS-REFERENCE TO RELATED APPLICATIONS

This application claims the priority of Korean Patent Application No. 10-2016-0067224 filed on May 31, 2016, in the Korean Intellectual Property Office, the disclosure of which is hereby incorporated by reference in its entirety.

BACKGROUND

1. Technical Field

The present disclosure relates to a method for compressing data and a display device using the same.

2. Description of the Related Art

As information-oriented society develops, various forms of demands for a display device displaying an image are increasingly made. Recently, various flat display devices such as a liquid crystal display device, a plasma display device, an organic light emitting diode device, an organic light emitting diode device, and the like have been used and developed.

Among these devices, the organic light emitting diode display device employs a self-luminous element and thus has advantages in that a response time is fast, luminous efficiency is high, and luminance and viewing angle are large.

Typically, such an organic light emitting diode display device employs a current driving method that controls the amount of current to thereby control the luminance of an organic light emitting diode.

FIG. 1 is an equivalent circuit diagram of a single pixel of a typical organic light emitting diode display device.

As shown in FIG. 1, a single pixel P includes a switching transistor $T_{sw}$, a driving transistor $T_{dr}$, an organic light emitting diode EL, and a capacitor $C_{st}$.

In particular, the switching transistor $T_{sw}$ applies a data voltage to a first node N1 in response to a scan signal. Further, the driving transistor $T_{dr}$ receives a driving voltage VDD applied thereto, and applies a current to the organic light emitting diode EL according to the driving voltage VDD and a voltage applied to the first node N1. And then, the capacitor $C_{st}$ sustains the voltage applied to the first node N1 for one frame.

A driving method of an organic light emitting diode display device including such a single pixel P will be described.

Firstly, when a scan signal is applied to a gate line GL, the switching transistor $T_{sw}$ is turned on. At this point, a voltage applied to a data line DL is charged at the capacitor $C_{st}$ via the switching transistor $T_{sw}$.

Next, when the scan signal is not applied to the gate line GL any longer, the driving transistor $T_{dr}$ is driven by a data voltage charged at the capacitor $C_{st}$. At this point, a current corresponding to the data voltage flows at the organic light emitting diode EL such that an image is displayed.

Here, the current flowing at the organic light emitting diode EL is significantly affected by a threshold voltage of the driving transistor $T_{dr}$. A value of such a threshold voltage of the driving transistor $T_{dr}$ is varied due to continuous applying of gate bias stress for a long time. This causes a characteristic deviation between the pixels P and thus image quality is degraded.

To address such a degradation problem in the image quality, a characteristic of the driving transistor $T_{dr}$ is sensed by flowing a predetermined current at the driving transistor $T_{dr}$ of each of the pixels P, and compensation data is calculated by applying the sensed characteristic to an external compensation algorithm. Further, the calculated compensation data is reflected to data that is input from an external source and then it is supplied to each of the pixels P.

Meanwhile, the calculated compensation data is stored in a memory before being reflected to the data being input from the external, and is supplied together with image data.

At this point, since the compensation data generally has a size of 10 bits per one pixel P, it has a size of 3840×2160× 3×10 bits based on an organic light emitting diode display device having ultra high definition (UHD) resolution.

Therefore, a large capacity memory, which is able to store compensation data having such a size, needs to be provided in the organic light emitting diode display device. However, such a large capacity memory in the organic light emitting diode display device in increase manufacturing costs. Generally, to reduce an increase of the manufacturing cost resulting from the employment of a large capacity memory, compensation data is compressed and then stored in a memory, and it is restored and supplied to each of the pixels P.

FIG. 2 is a block diagram of a conventional pixel-based data compression device, that is used for near-lossless compression.

As shown in FIG. 2, the conventional data compression device is configured with a pixel prediction unit 10, a quantization unit 11, and an entropy coder 12.

Here, the pixel prediction unit 10 processes input data calculating prediction values. The output of the pixel prediction unit 10 is a prediction error calculated as a difference between input value and predicted value.

The quantization unit 11 divides a prediction error value obtained from the pixel prediction unit 10 by a quantization step value and performs a process of reducing a number of significant bits (that is, a quantization process). Meanwhile, when data is restored to data' after such a quantization process, a difference in a data loss occurs according to a characteristic of the data.

The entropy coder 12 performs a compression process on the quantized prediction error values in consideration of an occurrence probability of the data loss.

However, such a compression method is a method applied to general image data, and the following problems may occur when the compression method is applied to compensation data.

That is, although a large amount of loss occurs at image data, to achieve high accuracy of compensation data reconstruction a quantization unit should be constructed based on sparse grid quantization when different quantization steps are applied for spatially different compensation data positions.

SUMMARY

It is an object of the present disclosure to provide a method for compressing data and a display device using the same, which is capable of preventing a data loss due to compression of data from being concentrated on pixels located at specific positions.

It is another object of the present disclosure to provide a method for compressing data and a display device using the same, which is capable of reducing a needed capacity of a memory for storing data to reduce costs for employing a large capacity memory.

It is still another object of the present disclosure to provide a method for compressing data and a display device using the same, which is capable of providing an optimum compression ratio, which is able to minimize a data loss.

It is still another object of the present disclosure to provide an organic light emitting diode display device in which a deviation of a threshold voltage of a driving transistor is effectively compensated such that image quality is improved.

Generally, unlike image data, a method of applying a quantization step value having a constant size to all pixels to perform quantization is used for compensation data. However, when such a method of performing quantization on the compensation data is used, a large amount of loss may occur at and concentrate on pixels, each of which is located at a specific concentrated position, so that a luminous dot or a dark dot may occur at the pixels, thereby degrading image quality.

To address such a problem, in accordance with the present disclosure, a quantization grid, to which a quantization step value is assigned at a position thereon corresponding to positions of the plurality of pixels, is firstly generated. A conformation of the quantization grid is determined according to an array dimension with which the plurality of pixels are provided.

Next, the quantization step value is assigned using a preset quantization parameter and a quantization function determined according to the array dimension.

Next, when the quantization step value is assigned, data, which is assigned to a pixel located at a position corresponding to a position of the quantization step value, is quantized using the quantization step value.

Specifically, in accordance with the present disclosure, the conformation of the quantization grid and a parameter used therein are changed according to the array dimension with which a plurality of pixels are provided. In accordance with the present disclosure, the quantization step value is assigned in a predetermined pattern according to such a parameter. The compensation data is quantized on the basis of the quantization grid having the assigned quantization step value such that a data loss due to quantization may be spatially distributed.

In accordance with one aspect of the present disclosure, a display device for compressing data assigned to each of a plurality of pixels arranged in an n dimensional array, wherein n is a natural number equal to or greater than 1, includes a grid generation unit configured to generate a quantization grid to which a quantization step value is assigned at positions thereon corresponding to positions of the plurality of pixels; a quantization unit configured to assign the quantization step value using a preset quantization parameter and a quantization function determined according to an array dimension of the n dimensional array, and quantize data, which is assigned to a pixel located at a position corresponding to a position of the quantization step value, using the quantization step value when the quantization step value is assigned; and an encoder configured to encode the quantized data.

Specifically, a method for compressing data in accordance with the present disclosure may be usefully used in compression of compensation data that is used in an organic light emitting diode display device.

In accordance with another aspect of the present disclosure, an organic light emitting diode display device includes a driving transistor, an organic light emitting diode, a display panel including a plurality of pixels that is arranged in an n dimensional array, wherein n is a natural number equal to or greater than 1, a data driving unit configured to supply a data signal to the plurality of pixels and generate compensation data according to a deviation of a threshold voltage of the driving transistor, and a compensation data processing unit configured to generate a quantization grid to which a quantization step value is assigned at positions thereon corresponding to positions of the plurality of pixels, assign the quantization step value using a preset quantization parameter and a quantization function determined according to an array dimension of the n dimensional array, and quantize and compress the compensation data.

In accordance with another aspect of the present disclosure, a method for compressing data assigned to each of a plurality of pixels arranged in an n dimensional array, wherein n is a natural number equal to or greater than 1, includes generating a quantization grid to which a quantization step value is assigned at a position thereon corresponding to positions of the plurality of pixels, assigning the quantization step value using a preset quantization parameter and a quantization function determined according to the an array dimension of the n dimensional array, quantizing data, which is assigned to a pixel located at a position corresponding to a position of the quantization step value, using the quantization step value when the quantization step value is assigned, and compressing the quantized data.

When such a data compression method is applied to compression of the compensation data, it may be possible to prevent a data loss due to the compression of the compensation data from being concentrated on pixels located at specific concentrated positions. That is, in accordance with the present disclosure, a data loss due to quantization may be spatially distributed.

Also, in accordance with the present disclosure, a capacity of a memory for storing the compensation data may be reduced such that manufacturing costs of an organic light emitting diode display device provided with a memory for storing the compensation data.

In accordance with the present disclosure, it may be possible to prevent a data loss due to compression of data from being concentrated on pixels located at specific concentrated positions. That is, in accordance with the present disclosure, a data loss due to quantization may be spatially distributed.

Also, in accordance with the present disclosure, a needed capacity of a memory for storing data may be reduced such that costs for employing a large capacity memory may be reduced.

Further, in accordance with the present disclosure, a method of compressing data may be provided an optimum compression ratio, which is able to minimize a data loss.

In addition, in accordance with the present disclosure, a deviation of a threshold voltage of a driving transistor may be effectively compensated such that image quality of an organic light emitting diode display device may be improved.

DETAILED DESCRIPTION

Figure 1:
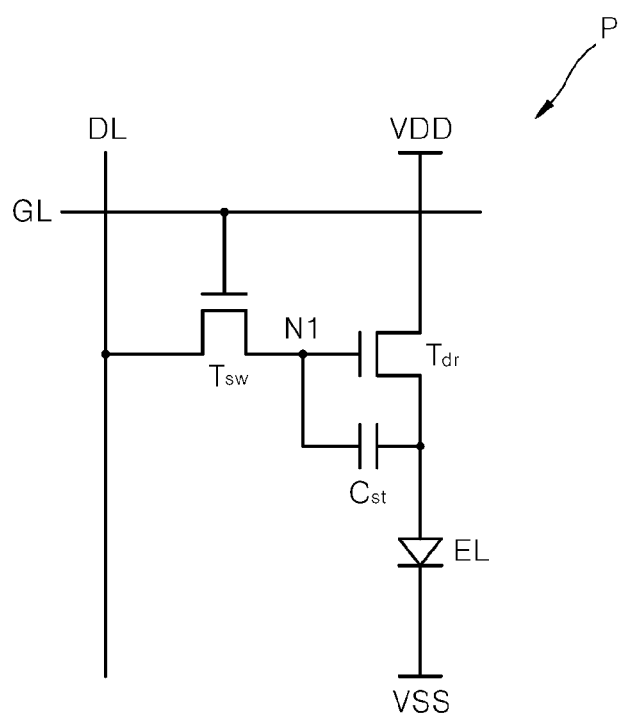
FIG. 1 is an equivalent circuit diagram of a single pixel of a conventional organic light emitting diode display device.
Figure 2:
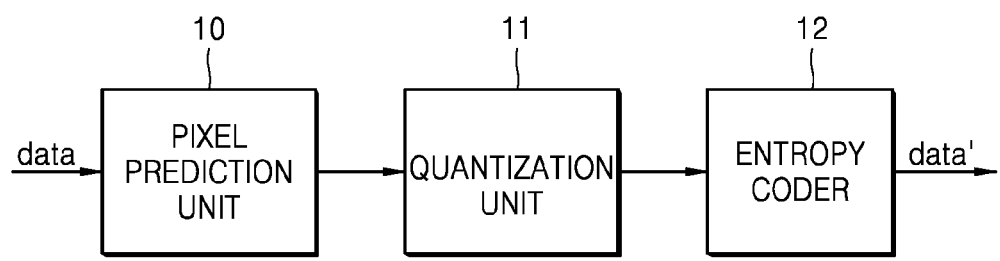
FIG. 2 is a block diagram of a conventional data compression device.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 3:
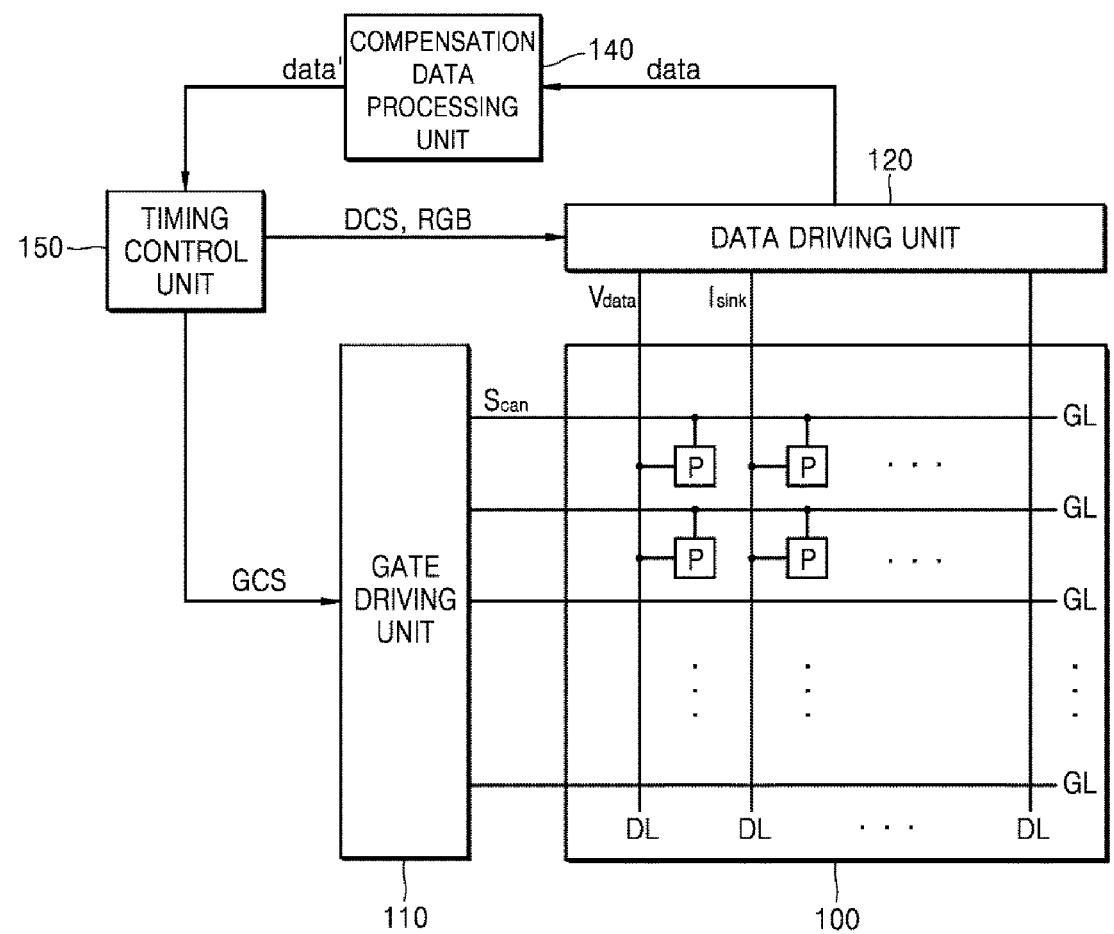
FIG. 3 is a diagram illustrating an organic light emitting diode display device according to an embodiment of the present disclosure.

FIG. 3 is a diagram illustrating an organic light emitting diode display device according to an embodiment of the present disclosure.

As shown in FIG. 3, the organic light emitting diode display device according to the embodiment of the present disclosure includes a display panel 100, a gate driving unit 110, a data driving unit 120, a compensation data processing unit 140, and a timing control unit 150.

The display panel 100 includes a plurality of gate lines GL and a plurality of data lines DL which intersect with each other, and a plurality of pixels P, each of which is disposed at every intersection of the respective gate lines GL and the respective data lines DL. Further, referring to FIG. 1, each of the plurality of pixels P includes a switching transistor $T_{sw}$, a driving transistor $T_{dr}$, an organic light emitting diode EL, and a capacitor $C_{st}$.

Meanwhile, although a plurality of pixels P arranged in a two dimensional array is shown in FIG. 3, the present disclosure is not limited thereto and the plurality of pixels P may be arranged in arrays of one or higher dimensions.

The gate driving unit 110 sequentially supplies a scan signal $S_{can}$ to each of the gate lines GL. The gate driving unit 110 may be disposed externally from the display panel 100 or embedded in the display panel 100 in a gate-in-panel manner.

The data driving unit 120 supplies a data voltage $V_{data}$ to the data lines DL, and senses a sink current flowing at each of the data lines DL to generate compensation data data corresponding to the sink current. Further, a data compensation circuit (not shown) to which an external compensation algorithm is applied may be embedded in the data driving unit 120 to generate the compensation data data.

The compensation data processing unit 140 quantizes, compresses, and stores the compensation data data generated by the data driving unit 120. Further, the compensation data processing unit 140 inverse quantizes and restores the stored compensation data data to supply the restored compensation data data to the timing control unit 150. More particularly, the compensation data processing unit 140 may generate a quantization grid, to which a quantization step value is assigned, at positions corresponding to each of the pixels P. Further, the compensation data processing unit 140 may quantize and compress the compensation data data by assigning the quantization step value thereto using a quantization function that is determined according to a predetermined parameter, and an array dimension of the quantization grid. Such a compensation data processing unit 140 may be embedded in the organic light emitting diode display device separately from the timing control unit 150.

Specifically, the compensation data data may be compressed through a data compression method, which will be described, according to an embodiment of the present disclosure.

The timing control unit 150 reflects the restored compensation data data' in image data RGB that is input from an external source. Further, the timing control unit 150 suitably aligns the image data RGB with a size, a resolution, and the like, of the display panel 100, to supply the aligned image data RGB to the data driving unit 120.

Also, the timing control unit 150 generates a plurality of gate control signals GCS and a plurality of data control signals DCS using synchronous signals that are input from an external source. Further, the timing control unit 150 supplies the gate control signals GCS and the data control signals DCS to the gate driving unit 110 and the data driving unit 120, respectively.

Figure 4:
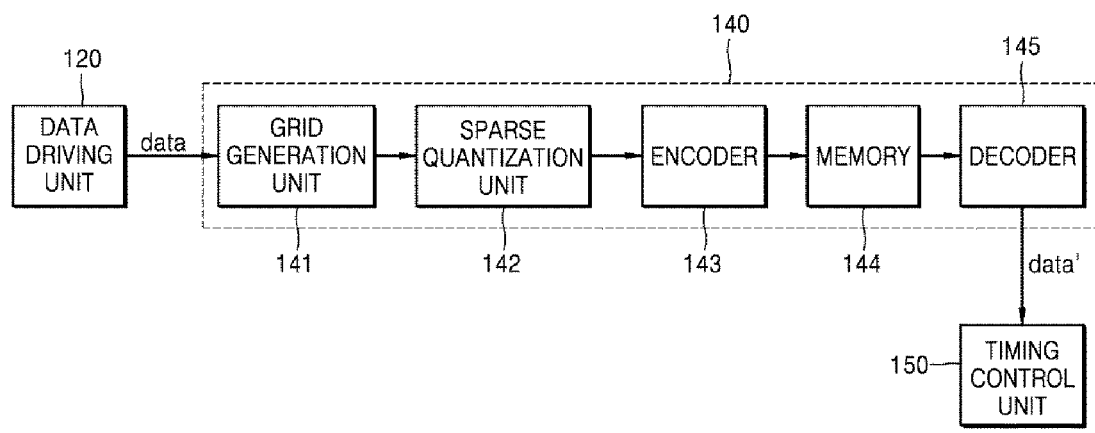
FIG. 4 is a detailed block diagram illustrating a compensation data processing unit according to an embodiment of the present disclosure.

FIG. 4 is a detailed block diagram of a compensation data processing unit according to an embodiment of the present disclosure.

As shown in FIG. 4, a compensation data processing unit 140 according to the embodiment of the present disclosure includes a grid generation unit 141, a sparse quantization unit 142, an encoder 143, a memory 144, and a decoder 145, and compresses the compensation data data that is assigned to a plurality of pixels arranged in an n dimensional array, wherein n is a natural number equal to or greater than 1.

The compensation data processing unit 140 quantizes and compresses the compensation data data generated by the data driving unit 120 to store the compressed compensation data data in the memory 144. Further, the compensation data processing unit 140 inverse quantizes and restores the stored compensation data data stored in the memory 144 to supply the restored compensation data data to the timing control unit 150.

In particular, the grid generation unit 141 generates a quantization grid, to which a quantization step value is assigned, at positions that correspond to positions of each of a plurality of pixels. A conformation of the quantization grid is determined according to an array dimension with which the plurality of pixels is provided.

When the plurality of pixels are arranged in an n dimensional array, the quantization grid is also arranged in an n dimensional conformation, wherein n is a natural number equal to or greater than 1.

The sparse quantization unit 142 assigns a quantization step value to the quantization grid using a preset quantization parameter and a quantization function that is determined according to an array dimension. When the quantization step value is assigned, the sparse quantization unit 142 quantizes compensation data, which is assigned to a pixel that is located at a position corresponding to a position of the quantization step value, using the quantization step value.

Here, a first quantization step value is assigned to the quantization grid at each of positions thereon in a regular interval in at least one direction, and a second quantization step value is assigned to each of the remaining positions on the quantization grid.

When the plurality of pixels are arranged in a one dimensional array, a quantization parameter includes an interval parameter. Further, a first quantization step value is assigned to the quantization grid at each of positions thereon in an interval corresponding to the interval parameter, and a second quantization step value is assigned to each of the remaining positions on the quantization grid.

When the plurality of pixels are arranged in a two dimensional array, the quantization parameter includes a horizontal interval parameter and a vertical interval parameter. Further, the first quantization step value is assigned to the quantization grid at each of positions thereon in an interval corresponding to the horizontal interval parameter and the vertical interval parameter, and the second quantization step value is assigned to each of the remaining positions on the quantization grid.

Alternatively, when the plurality of pixels are arranged in the two dimensional array, the quantization parameter includes the horizontal interval parameter, the vertical interval parameter, and a horizontal shift parameter. Further, the first quantization step value is assigned to the quantization grid at each of positions thereon in an interval corresponding to the horizontal interval parameter in which the horizontal shift parameter is reflected and the vertical interval parameter, and the second quantization step value is assigned to each of the remaining positions on the quantization grid.

When the plurality of pixels are arranged in a three dimensional array, the quantization parameter includes the horizontal interval parameter, the vertical interval parameter, and a depth interval parameter. Further, the quantization step value is assigned to the quantization grid at each of positions thereon in an interval corresponding to the horizontal interval parameter, the vertical interval parameter, and the depth interval parameter, and the second quantization step value is assigned to each of the remaining positions on the quantization grid.

Alternatively, when the plurality of pixels are arranged in the three dimensional array, the quantization parameter includes the horizontal interval parameter, the vertical interval parameter, the horizontal shift parameter, and the depth interval parameter. Further, the first quantization step value is assigned to the quantization grid at each of positions thereon in an interval corresponding to the horizontal interval parameter in which the horizontal shift parameter is reflected, the vertical interval parameter, and the depth interval parameter, and the second quantization step value is assigned to each of the remaining positions on the quantization grid.

Alternatively, when the plurality of pixels are arranged in the three dimensional array, the quantization parameter includes the horizontal interval parameter, the vertical interval parameter, the horizontal shift parameter, the depth interval parameter, and a vertical shift parameter. Further, the first quantization step value is assigned to the quantization grid at each of positions thereon in an interval corresponding to the horizontal interval parameter in which the horizontal shift parameter is reflected, the vertical interval parameter in which the vertical shift parameter is reflected, and the depth interval parameter, and the second quantization step value is assigned to each of the remaining positions on the quantization grid.

The encoder 144 compresses the quantized compensation data data, and the decoder 145 inverse quantizes and restores the compressed compensation data data.

At this point, quantization step values Q and Q-q may be set to two or more values that are different from each other. Further, when the compensation data data, which are assigned to the plurality of pixels P, are quantized using the quantization step values Q and Q-q that are different from each other, data losses of the compensation data data according to quantization are different from each other.

As described above, in accordance with the present disclosure, the quantization step value is assigned to the quantization grid in a repetitive pattern using the quantization parameter and the quantization function such that it may prevent a data loss, which is caused according to compression of the compensation data data assigned to each of the plurality of pixels, from being concentrated on pixels that are located at specific positions. That is, a data loss due to quantization may be spatially distributed.

Also, in accordance with the present disclosure, a repetitive pattern interval of the quantization step values Q and Q-q may be adjusted such that it may be possible to provide an optimum compression ratio, which is capable of minimizing a data loss, with respect to the compensation data data. In other words, it may be possible to reduce a capacity of the memory 144 for storing the compressed compensation data data such that costs for employing a large capacity memory may be reduced.

Moreover, in accordance with the present disclosure, since a loss of the compensation data data is spatially distributed, a deviation of a threshold voltage of the driving transistor $T_{dr}$ is effectively compensated such that image quality of the organic light emitting diode display device may be improved.

Hereinafter, a method for compressing data will be described and the data includes the above described compensation data.

Figure 5:
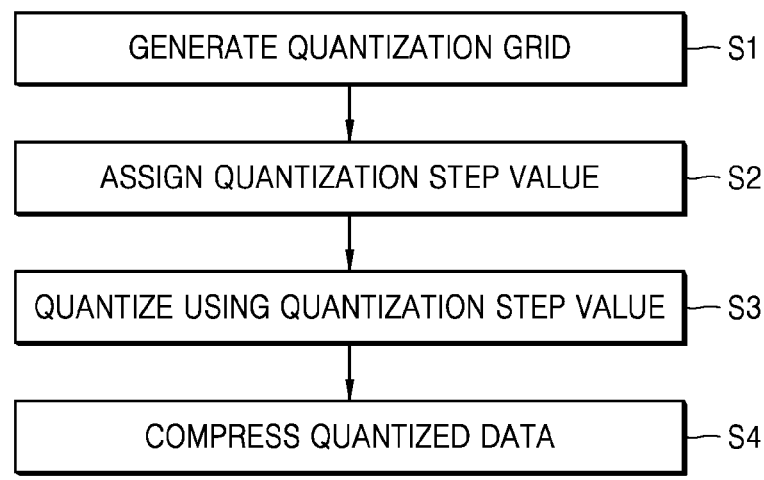
FIG. 5 is a flow chart of a data compression method according to an embodiment of the present disclosure.

FIG. 5 is a flow chart of a data compression method according to an embodiment of the present disclosure.

As shown in FIG. 5, the data compression method according to the present disclosure compresses data assigned to each of a plurality of pixels that are arranged in an n dimensional array, wherein n is a natural number equal to or greater than 1. Further, the data compression method includes generating a quantization grid in Operation S1, assigning a quantization step value to the quantization grid in Operation S2, performing quantization using the quantization step value in Operation S3, and compressing quantized data in Operation S4.

Firstly, in Operation S1 of generating a quantization grid, a quantization grid Grid, in which a quantization step value is assigned to positions corresponding to positions of each of a plurality of pixels, is generated. A conformation of the quantization grid is determined according to an array dimension with which the plurality of pixels are provided.

Next, in Operation S2 of assigning a quantization step value to the quantization grid, the quantization step value is assigned through a quantization function that is determined according to a preset quantization parameter and the array dimension. At this point, the quantization step value may be set to two or more values that are different from each other.

Next, in Operation S3 of performing quantization using the quantization step value, when the quantization step value is assigned, data assigned to a pixel is quantized using the quantization step value, wherein the data is located at a position corresponding to a position of the quantization step value. At this point, when data assigned to a plurality of pixels are quantized using quantization step values that are different from each other, data losses according to the quantizations are different from each other.

Lastly, in Operation S4 of compressing the quantized data, the quantized data is compressed through coding and the like.

Through such Operations, the quantization according to the present disclosure may prevent a data loss due to compression of the data from being concentrated on pixels located at specific positions compared to that which quantizes data assigned to a plurality of pixels using the same quantization step values. That is, in accordance with the present disclosure, a data loss due to quantization may be spatially distributed.

Also, the quantization according to the present disclosure may reduce a needed capacity of a memory for storing compressed data compared to that which quantizes data assigned to a plurality of pixels using a quantization step value determined according to a characteristic of each data, such that costs for employing a large capacity memory may be reduced.

Hereinafter, the data compression method according to an embodiment of the present disclosure will be described in detail with respect to cases in which a plurality of pixels are arranged in one to three dimensional arrays.

Figure 6:
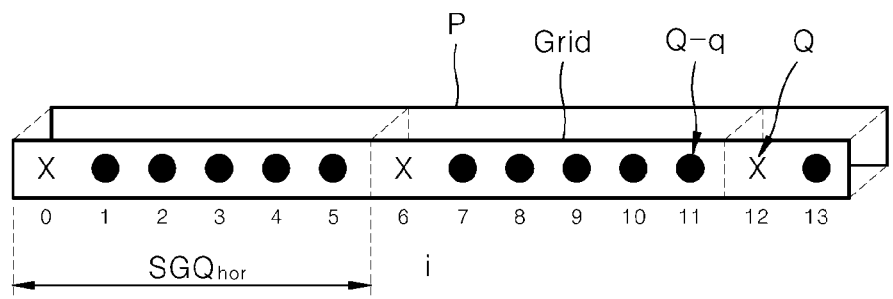
FIG. 6 is a diagram illustrating a quantization grid arranged in a one dimensional array according to an embodiment of the present disclosure.

FIG. 6 is a diagram illustrating a quantization grid arranged in a one dimensional array according to an embodiment of the present disclosure.

As shown in FIG. 6, when a plurality of pixels P are arranged in a one dimensional array, a quantization grid Grid corresponding to the plurality of pixels P is also arranged in a one dimensional array. A quantization parameter includes a horizontal interval parameter $SGQ_{hor}$. Further, first and second quantization step values Q and Q-q are assigned to the quantization grid Grid at positions corresponding to positions of the plurality of pixels P.

The first and second quantization step values Q and Q-q are determined using a preset horizontal interval parameter $SGQ_{hor}$ and a quantization function SG(i). Further, the first quantization step value Q is assigned to the quantization grid Grid at each of positions thereon in an interval corresponding to the horizontal interval parameter $SGQ_{hor}$, and the second quantization step value Q-q is assigned to each of the remaining positions on the quantization grid Grid.

Alternatively, in another embodiment of the present disclosure, the second quantization step value Q-q is assigned to the quantization grid Grid at each of positions thereon in an interval corresponding to the horizontal interval parameter $SGQ_{hor}$, and the first quantization step value Q is assigned to each of the remaining positions on the quantization grid Grid.

Here, the quantization function SG(i) is defined by the following Equation 1.

$$SG(i) = \begin{cases} 1, & \text{if } (i \% SGQhor) \equiv 0 \\ 0, & \text{otherwise} \end{cases} \quad \text{[Equation 1]}$$

Here, i is a position of the quantization grid Grid and i=0, 1, ..., W−1 (herein W is an array number of the quantization grid Grid), and (i % $SGQ_{hor}$)=0 means that the remainder is 0 when i is divided by the horizontal interval parameter $SGQ_{hor}$.

Equation 1 means that values of the quantization function SG(i) have 1 at a first position of the quantization grid Grid and at positions thereon in an interval of the horizontal interval parameter $SGQ_{hor}$ based on the first position, and have 0 at the remaining positions on the quantization grid Grid.

At this point, the first quantization step value Q may be assigned to each of the positions at which the values of the quantization function SG(i) have 1, and the second quantization step value Q-q may be assigned to each of the remaining positions at which the first quantization step value Q is not assigned.

Meanwhile, in the embodiment of FIG. 6, the first quantization step value Q is marked with X, and the second quantization step value Q-q is marked with •. Further, in the illustrated embodiment, the first and second quantization step values Q and Q-q are determined by setting the array number of the quantization grid Grid to 14 and the horizontal interval parameter $SGQ_{hor}$ to 6.

Here, when Equation 1 is applied, the values of the quantization function SG(i) have 1 at positions corresponding to i=0, 6, and 12, and they have 0 at the remaining positions. Further, as shown in the drawing, the first quantization step value Q is assigned to each of the positions corresponding to i=0, 6, and 12, and the second quantization step value Q-q is assigned to each of the remaining positions. In another embodiment of the present disclosure, the first and second quantization step values Q and Q-q may be assigned to positions and values contrary to the described description.

For example, the first and second quantization step values Q and Q-q may be set to 5 and 1, respectively, and then assigned to the quantization grid Grid using the quantization parameter and the quantization function SG(i). Further, when data, which are assigned to pixels located at positions corresponding to the quantization grid Grid, are quantized, data losses of the data assigned to each of positions corresponding to i=0, 6, and 12 may be greater than those of the data assigned to the remaining positions during a restoration process after the compression.

As described above, in accordance with the present disclosure, the quantization step values Q and Q-q are assigned to the 1-dimensional quantization grid Grid in a repetitive pattern using the quantization parameter $SGQ_{hor}$ and the quantization function SG(i). Consequently, the above method may prevent a data loss due to compression of the data, which is assigned to each of the plurality of pixels P arranged in a one dimensional array, from being concentrated on pixels P located at specific positions. That is, in accordance with the present disclosure, the data loss due to compression may be spatially distributed.

Also, in accordance with the present disclosure, repetitive pattern intervals of the quantization step values Q and Q-q are adjusted such that it may be possible to provide an optimum compression ratio of data, which is capable of minimizing a data loss. That is, a needed capacity of a memory for storing compressed data may be reduced such that costs for employing a large capacity memory may be reduced.

Figure 7:
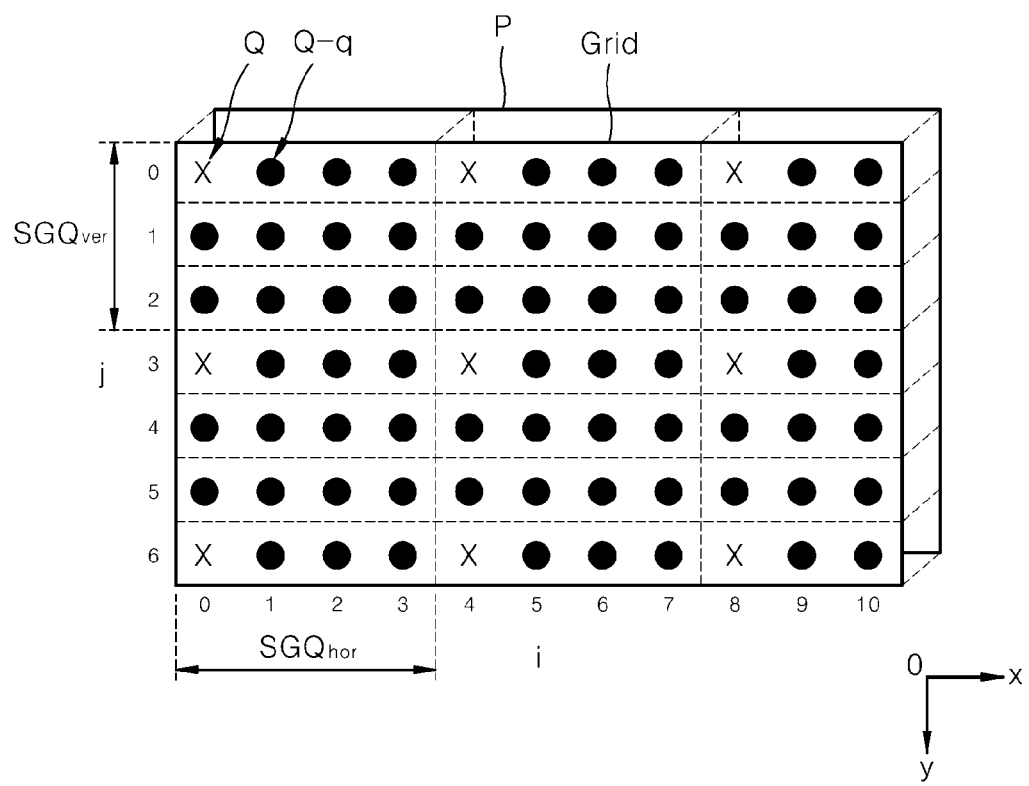
FIGS. 7 and 8 are diagrams illustrating a quantization grid arranged in a two dimensional array according to an embodiment of the present disclosure.
Figure 8:
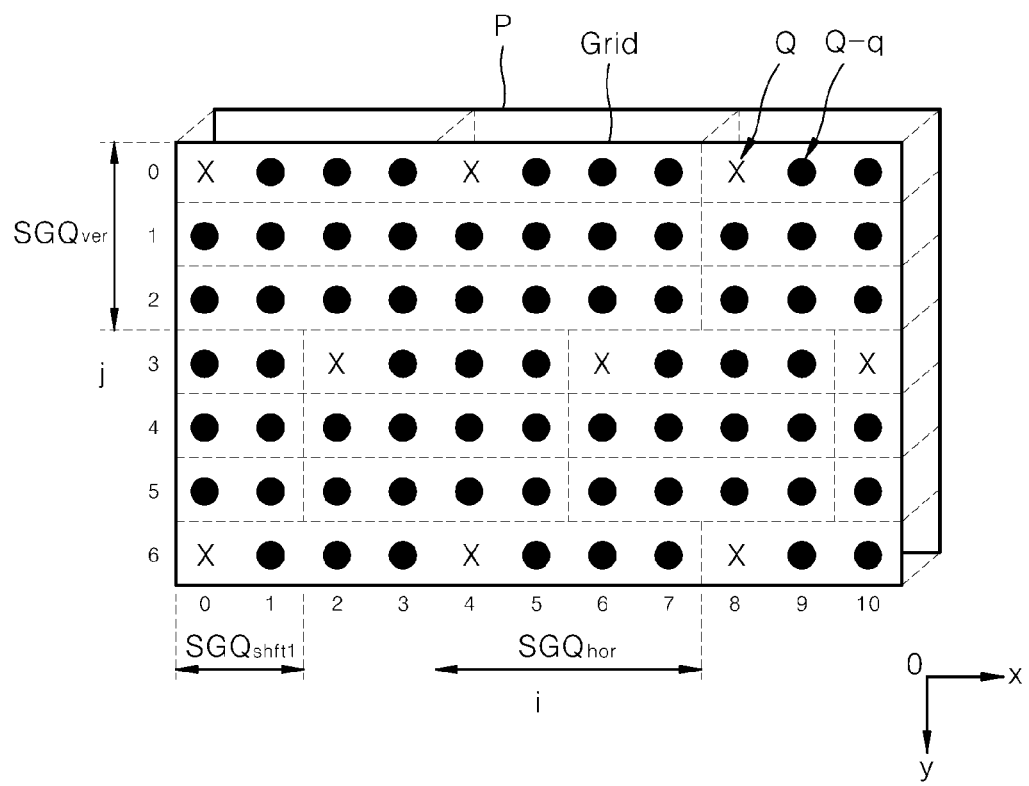

FIGS. 7 and 8 are diagrams illustrating a quantization grid arranged in a two dimensional array according to an embodiment of the present disclosure.

As shown in FIGS. 7 and 8, when a plurality of pixels P are arranged in a two dimensional array, a quantization grid Grid corresponding to the plurality of pixels P is also arranged in a two dimensional array. Further, a quantization parameter SGQ includes a horizontal interval parameter $SGQ_{hor}$, a vertical interval parameter $SGQ_{ver}$, and a horizontal shift parameter $SGQ_{shft1}$. Also, first and second quantization step values Q and Q-q are assigned to the quantization grid Grid at positions thereon corresponding to positions of the plurality of pixels P.

The first and second quantization step values Q and Q-q are determined based on a horizontal interval parameter $SGQ_{hor}$, a vertical interval parameter $SGQ_{ver}$, a horizontal shift parameter $SGQ_{shft1}$, which are preset, and a quantization function SG(i,j). Further, the first quantization step value Q is assigned to the quantization grid Grid at each of positions thereon in an interval corresponding to the horizontal interval parameter $SGQ_{hor}$ in which the horizontal shift parameter $SGQ_{shft1}$ is reflected, and the vertical interval parameter $SGQ_{ver}$, and the second quantization step value Q-q is assigned to each of the remaining positions on the quantization grid Grid.

Here, the quantization function SG(i,j) is defined by the following Equations 2 to 5.

$$SG(i, j) = Fh(SGQhor, shft1, i) * Fv(SGQver, i) \quad [\text{Equation 2}]$$

$$Fv(SGQver, j) = \begin{cases} 1, & \text{if } (j \% SGQver) \equiv 0 \\ 0, & \text{otherwise} \end{cases} \quad [\text{Equation 3}]$$

$$Fh(SGQhor, shft1, i) = \begin{cases} 1, & \text{if } (i + shft1) \% SGQhor \equiv 0 \\ 0, & \text{otherwise} \end{cases} \quad [\text{Equation 4}]$$

$$shft1(SGQshft1, SGQver, j) = \left(\frac{j}{SGQver}\right) * SGQshft1 \quad [\text{Equation 5}]$$

Here, i and j are x-axis and y-axis positions on the quantization grid Grid, respectively, and i=0, 1, . . . , W−1 (herein, W is an x-axis array number of the quantization grid Grid) and j=0, 1, . . . , H−1 (herein, H is a y-axis array number of the quantization grid Grid). Also, (j % $SGQ_{ver}$)≡0 means that the remainder is 0 when j is divided by the vertical interval parameter $SGQ_{ver}$, and (i+shft1) % $SGQ_{hor}$≡0 means that the remainder is 0 when (i+shft1) is divided by the horizontal interval parameter $SGQ_{hor}$.

Further, a first quantization function Fh($SGQ_h$,shft1,i) defines quantization step values Q and Q-q at x-axis positions, and a second quantization function Fv($SGQ_{ver}$,j) defines quantization step values Q and Q-q at y-axis positions. Here, a value shft1 of a first shift function is used to determine the first quantization function Fh($SGQ_h$,shft1,i) and is given by a first shift function shft1($SGQ_{shft1}$, $SGQ_{ver}$, j).

Firstly, Equation 2 means that values of the quantization function SG(i,j) are given by multiplying a first quantization function Fh($SGQ_{hor}$,shft1,i) by a second quantization function Fv($SGQ_{ver}$,j).

Equation 3 means that y-axis values among the values of the quantization function SG(i,j) have 1 at a first y-axis position on the quantization grid Grid and at positions thereon in an interval of the vertical interval parameter $SGQ_{ver}$ based on the first y-axis position, and have 0 at the remaining positions on the quantization grid Grid.

Next, Equation 4 means that x-axis values among the values of the quantization function SG(i,j) have 1 at a first x-axis position on the quantization grid Grid and at positions thereon in an interval of the horizontal interval parameter $SGQ_{hor}$ based on the first x-axis position, and have 0 at the remaining positions on the quantization grid Grid.

Next, Equation 5 means that 1, which is given by Equation 4, is shifted by an amount corresponding to the horizontal shift parameter $SGQ_{shft1}$ in an interval corresponding to the vertical interval parameter $SGQ_{ver}$. Such a shift is illustrated in FIG. 8.

At this point, the first quantization step value Q may be assigned to each of the positions at which the values of the quantization function SG(i) have 1, and the second quantization step value Q-q may be assigned to each of the remaining positions.

Meanwhile, in the embodiment of FIGS. 7 and 8, the first quantization step value Q is marked with X, and the second quantization step value Q-q is marked with •.

Further, in the illustrated embodiment, the first and second quantization step values Q and Q-q are determined by setting an x-axis array number of the quantization grid Grid to 11, a y-axis array number thereof to 7, the horizontal interval parameter $SGQ_{hor}$ to 4, the vertical interval parameter $SGQ_{ver}$ to 3, and the horizontal shift parameter $SGQ_{shft1}$ to 0 or 2.

Here, FIG. 7 shows a case in which the horizontal shift parameter $SGQ_{shft1}$ is 0, and FIG. 8 shows a case in which the horizontal shift parameter $SGQ_{shft1}$ is not 0.

Firstly, in FIG. 7, since the horizontal shift parameter $SGQ_{shft1}$ is 0, Equation 5 is not applied and the value shft1 of the first shift function of Equation 4 becomes 0.

Here, when Equation 3 is applied, the value of the second quantization function Fv($SGQ_{ver}$,j) becomes 1 at each of positions corresponding to j=0, 3, and 6, and it becomes 0 at each of the remaining positions. On the other hand, when Equation 4 is applied, the value of the first quantization function Fh($SGQ_{hor}$,shft1,i) becomes 1 at each of positions corresponding to i=0, 4, and 8 in case of j=0, 3, and 6, and it becomes 0 at each of the remaining positions.

Further, when Equation 2 is applied, the value of the quantization function SG(i,j) becomes 1 at each of positions at which the value of the first quantization function Fh($SGQ_{hor}$,shft1,i) and the value of the second quantization function Fv($SGQ_{ver}$,j) are 1.

Also, as shown in FIG. 7, the first quantization step value Q may be assigned to each of positions at which the value of the quantization function SG(i,j) is 1, and the second quantization step value Q-q may be assigned to each of the remaining positions. Alternatively, the first and second quantization step values Q and Q-q may be assigned to positions and values contrary to the above description.

Next, in FIG. 8, since the horizontal shift parameter $SGQ_{shft1}$ is not 0, Equation 5 is applied unlike in FIG. 7.

Here, when Equation 3 is applied, the value of the second quantization function Fv($SGQ_{ver}$,j) becomes 1 at each of positions corresponding to j=0, 3, and 6, and it becomes 0 at each of the remaining positions. On the other hand, when Equations 4 and 5 are applied, the function of the first quantization function Fh($SGQ_{hor}$,shft1,i) becomes 1 at each of positions corresponding to i=0, 4, and 8 in case of j=0 and 6, and at each of positions corresponding to i=2, 6, and 10 in case of j=3, and it becomes 0 at each of the remaining positions.

Further, when Equation 2 is applied, the value of the quantization function SG(i,j) becomes 1 at each of positions at which the value of the first quantization function Fh($SGQ_{hor}$,shft1,i) and the value of the second quantization function Fv($SGQ_{ver}$,j) are 1.

Also, as shown in FIG. 8, the first quantization step value Q may be assigned to each of positions at which the value of the quantization function SG(i,j) is 1, and the second quantization step value Q-q may be assigned to each of the remaining positions. Alternatively, the first and second quantization step values Q and Q-q may be assigned to positions and values contrary to the above description.

Consequently, the quantization grid Grid of FIG. 8 is shifted by an amount corresponding to the horizontal shift parameter $SGQ_{shft1}$ in an interval corresponding to the vertical interval parameter $SGQ_{ver}$. That is, a data loss due to the quantization may be spatially more distributed by an amount of the shifting.

As described above, in accordance with the present disclosure, the quantization step values Q and Q-q are assigned to the quantization grid Grid in a repetitive pattern using the quantization parameters $SGQ_{hor}$, $SGQ_{ver}$, and $SGQ_{shft1}$, and the quantization function SG(i,j), such that it may be possible to prevent a data loss due to the compression of data, which is assigned to each of a plurality of pixels P arranged in a two dimensional array, from being concentrated on pixels P at specific concentrated positions. That is, in accordance with the present disclosure, the data loss due to the quantization may be spatially distributed.

Also, in accordance with the present disclosure, repetitive pattern intervals of the quantization step values Q and Q-q are adjusted such that it may be possible to provide an optimum compression ratio of data, which is capable of minimizing a data loss. That is, a needed capacity of a memory for storing the compressed data may be reduced such that costs for employing a large capacity memory may be reduced.

Figure 9:
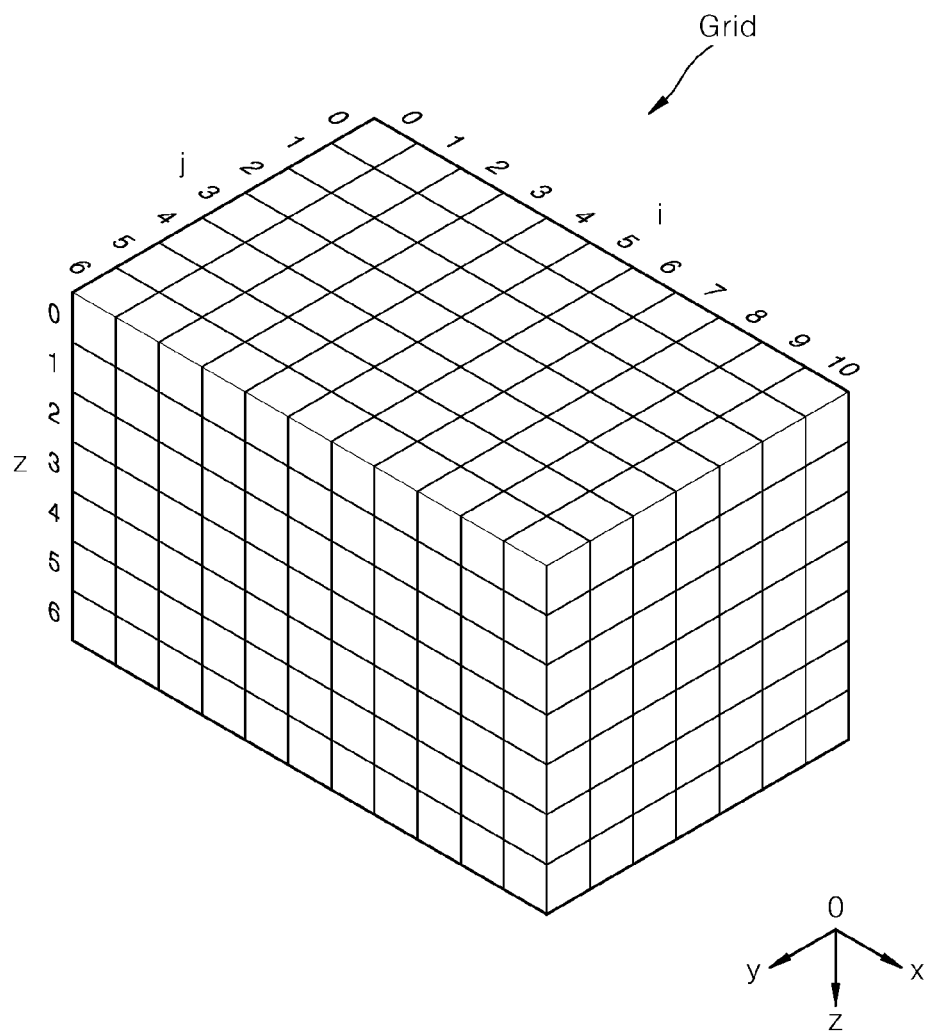
FIG. 9 is a diagram illustrating a quantization grid arranged in a three dimensional array according to an embodiment of the present disclosure.
Figure 10A:
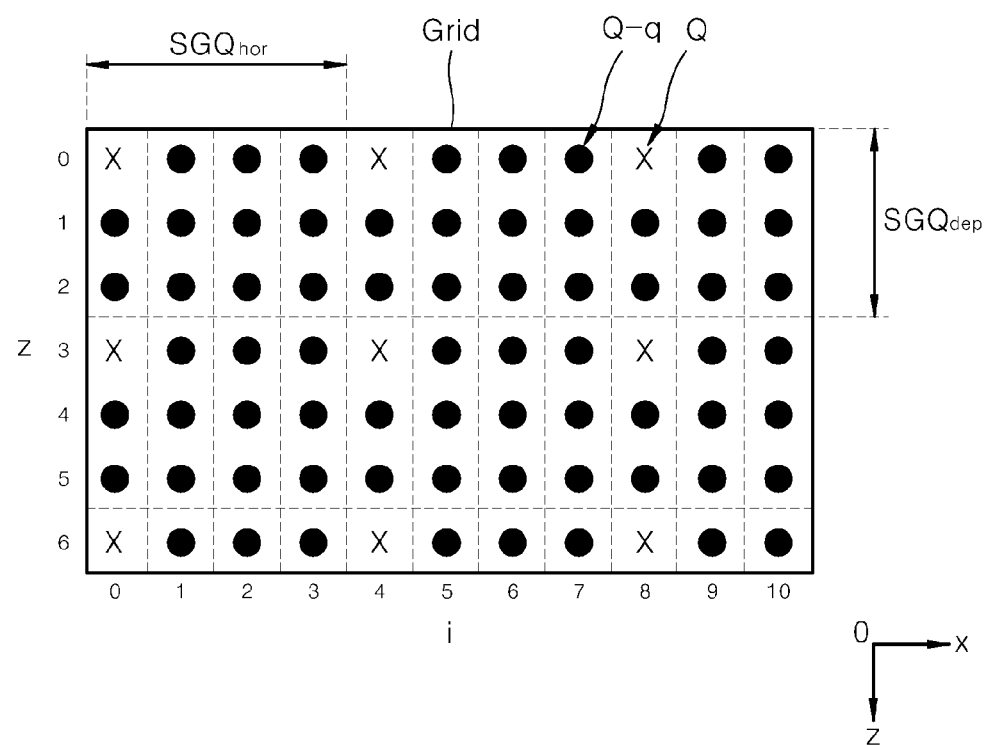
FIGS. 10(A), 11(A), and 12(A) are diagrams illustrating an x-z plane of FIG. 9.
Figure 10B:
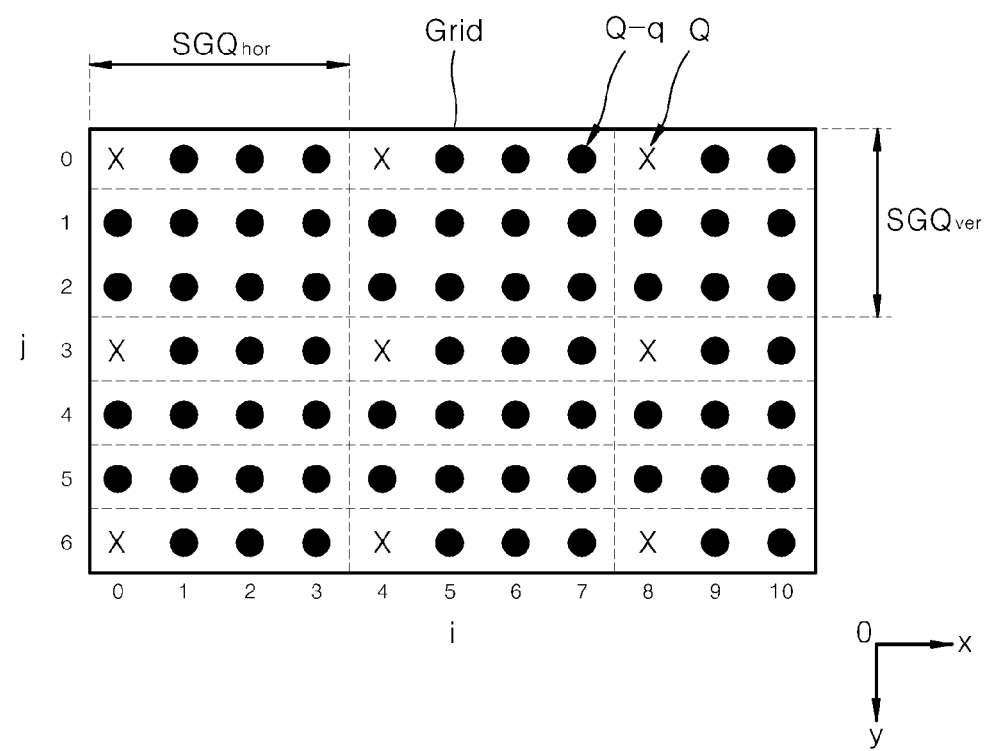
FIGS. 10(B), 11(B), and 12(B) are diagrams illustrating a plane of which z is 0 of the x-y plane of FIG. 9.
Figure 10C:
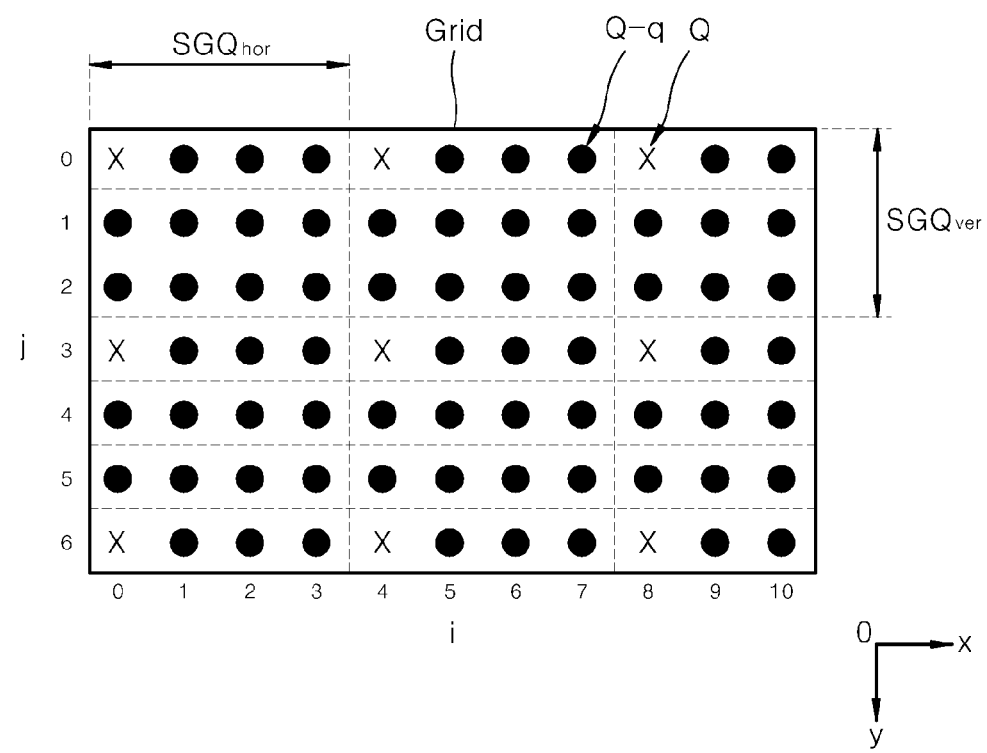
FIGS. 10(C), 11(C), and 12(C) are diagrams illustrating a plane of which z is 3 of the x-y plane of FIG. 9.
Figure 11A:
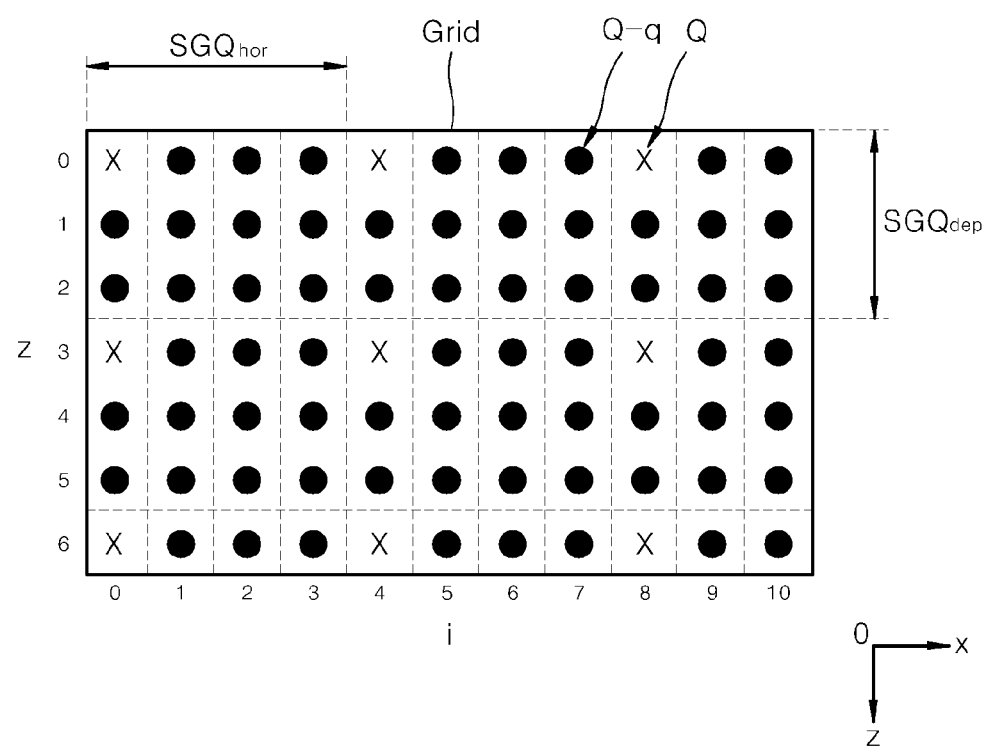
Figure 11B:
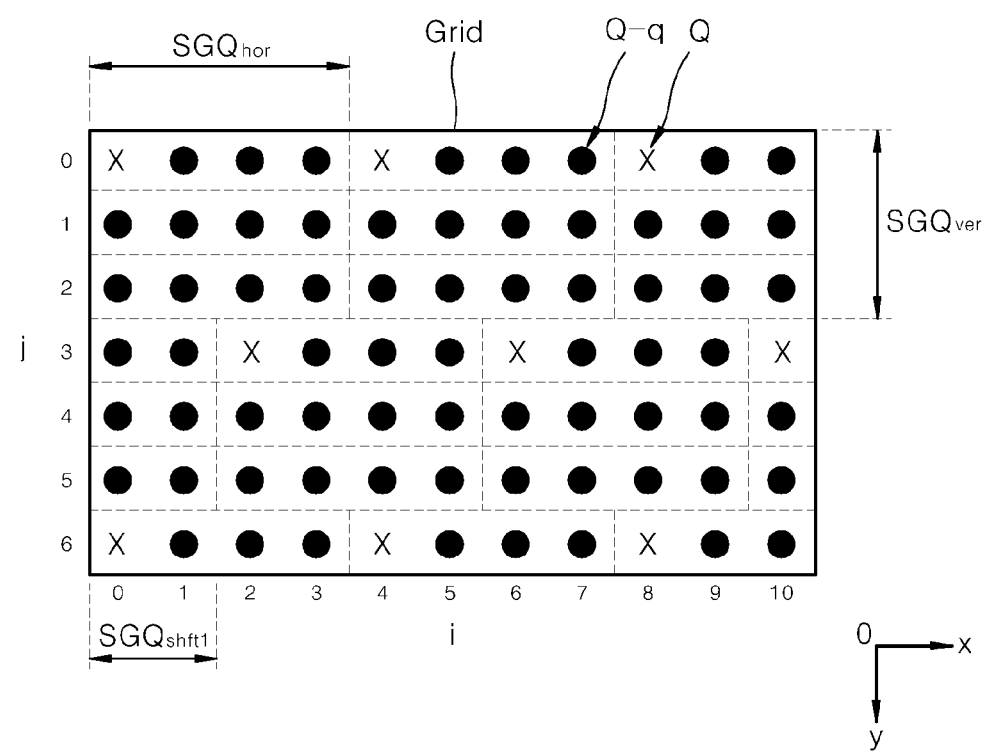
Figure 11C:
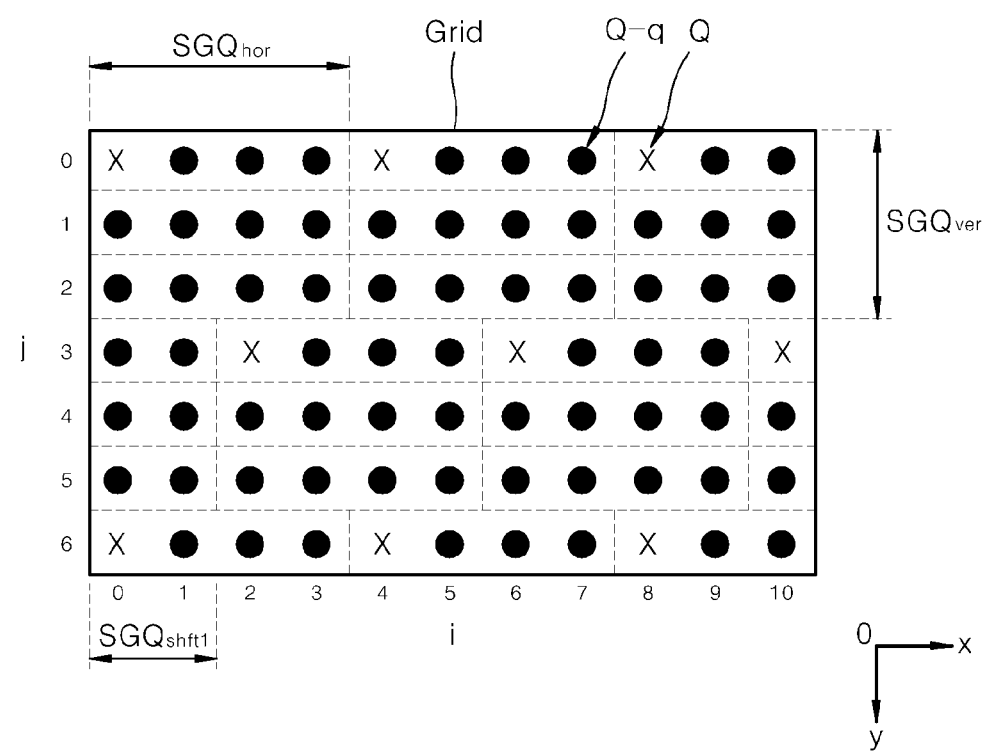
Figure 12A:
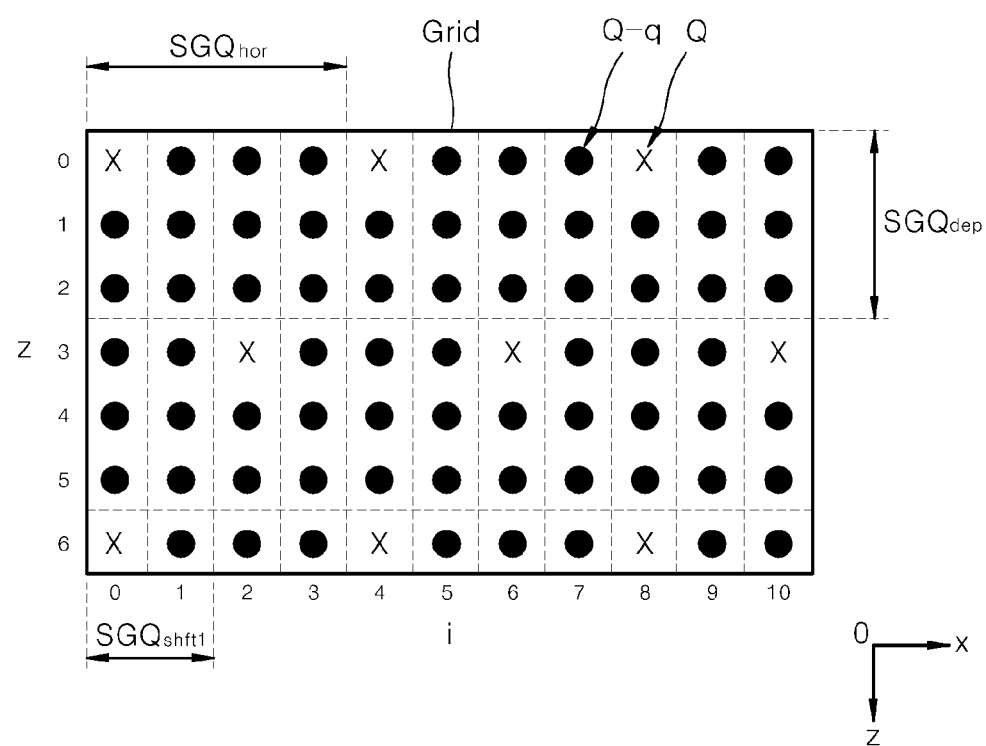

FIG. 9 is a diagram illustrating a quantization grid arranged in a three dimensional array according to an embodiment of the present disclosure, FIGS. 10(A), 11(A), and 12(A) are diagrams illustrating an x-z plane of FIG. 9, FIGS. 10(B), 11(B), and 12(B) are diagrams illustrating a plane of which z is 0 of the x-y plane of FIG. 9, and FIGS. 10(C), 11(C), and 12(C) are diagrams illustrating a plane of which z is 3 of the x-y plane of FIG. 9.

As shown in the drawings, when a plurality of pixels are arranged in a three dimensional array, a quantization grid Grid corresponding the plurality of pixels is also arranged in a three dimensional array. Further, a quantization parameter SGQ includes a horizontal interval parameter $SGQ_{hor}$, a vertical interval parameter $SGQ_{ver}$, a horizontal shift parameter $SGQ_{shft1}$, a vertical shift parameter $SGQ_{shft2}$ and a depth interval parameter $SGQ_{dep}$. Also, first and second quantization step values Q and Q-q are assigned to the quantization grid Grid at positions thereon corresponding to the plurality of pixels.

The first and second quantization step values Q and Q-q are determined using a horizontal interval parameter $SGQ_{hor}$, a vertical interval parameter $SGQ_{ver}$, a horizontal shift parameter $SGQ_{shft1}$, a vertical shift parameter $SGQ_{shft2}$, and a depth interval parameter $SGQ_{dep}$, which are preset, and a quantization function SG(i,j,z).

The first quantization step value Q is assigned to the quantization grid Grid at each of positions thereon in an interval corresponding to the horizontal interval parameter $SGQ_{hor}$ in which the horizontal shift parameter $SGQ_{shft1}$ is reflected, the vertical interval parameter $SGQ_{ver}$ in which the vertical shift parameter $SGQ_{shft2}$ is reflected, and the depth interval parameter $SGQ_{dep}$, and the second quantization step value Q-q is assigned to each of the remaining positions on the quantization grid Grid.

Here, the quantization function SG(i,j,z) is defined by the following Equations 6 to 11.

$$SG(i, j, z) = Fh(SGQhor, shft1, i) * Fv(SGQver, shft2, j) * Fd(SGQdep, z) \quad \text{[Equation 6]}$$

$$Fd(SGQdep, z) = \begin{cases} 1, & \text{if } (z \% SGQdep) \equiv 0 \\ 0, & \text{otherwise} \end{cases} \quad \text{[Equation 7]}$$

$$Fv(SGQver, shft2, j) = \begin{cases} 1, & \text{if } (j + shft2) \% SGQver \equiv 0 \\ 0, & \text{otherwise} \end{cases} \quad \text{[Equation 8]}$$

$$shft2(SGQshft2, SGQdep, z) = \left(\frac{z}{SGQdep}\right) * SGQshft2 \quad \text{[Equation 9]}$$

$$Fh(SGQhor, shft1, i) = \begin{cases} 1, & \text{if } (i + shft1) \% SGQhor \equiv 0 \\ 0, & \text{otherwise} \end{cases} \quad \text{[Equation 10]}$$

$$shft1(SGQshft1, SGQver, j, shft2) = \left(\frac{j + shft2}{SGQver}\right) * SGQshft1 \quad \text{[Equation 11]}$$

Here, i, j, and z are an x-axis position, a y-axis position, a z-axis position on the quantization grid Grid, respectively, and also i=0, 1, . . . , W−1 (herein, W is an x-axis array number of the quantization grid Grid), j=0, 1, . . . , H−1 (herein, H is a y-axis array number of the quantization grid Grid), and z=0, 1, . . . , D−1 (herein, D is a z-axis array number of the quantization grid Grid). Further, (z % $SGQ_{dep}$)≡0 means that the remainder is 0 when z is divided by the depth interval parameter $SGQ_{dep}$, (j+shft2)% $SGQ_{ver}$≡0 means that the remainder is 0 when (j+shft2) is divided by the vertical interval parameter $SGQ_{ver}$, and (i+shft1)% $SGQ_{hor}$≡0 means that the remainder is 0 when (i+shft1) is divided by the horizontal interval parameter $SGQ_{hor}$.

Also, a first quantization function Fh($SGQ_{hor}$,shft1,i) defines a quantization step value at the x-axis position, a second quantization function Fv($SGQ_{ver}$,shft2,j) defines a quantization step value at the y-axis position, and a third quantization function Fd($SGQ_{dep}$,z) defines a quantization step value at the z-axis position.

Here, a value shft1 of a first shift function is used to determine the first quantization function Fh($SGQ_{hor}$,shft1,i) and is given by the first shift function shft1($SGQ_{shft1}$, $SGQ_{ver}$,j,shft2). Further, a value shft2 of a second shift function is used to determine the second quantization function Fv($SGQ_{ver}$,shft2,j), and is given by the second shift function shft2($SGQ_{shft2}$,$SGQ_{dep}$,z).

Firstly, Equation 6 means that values of the quantization function SG(i,j,z) are given by multiplying first quantization function Fh($SGQ_h$,shft1,i), the second quantization function Fv($SGQ_{ver}$,shft2,j), and the third quantization function Fd(SGQdep,z).

Next, Equation 7 means that z-axis values among the values of the quantization function SG(i,j,z) have 1 at a first z-axis position on the quantization grid Grid and at positions thereon in an interval corresponding the depth interval parameter $SGQ_{dep}$ based on the first z-axis position, and have 0 at the remaining positions on the quantization grid Grid.

Next, Equation 8 means that y-axis values among the values of the quantization function SG(i,j,z) have 1 at a first y-axis position on the quantization grid Grid and at positions thereon in an interval corresponding the vertical interval parameter $SGQ_{ver}$ based on the first y-axis position, and have 0 at the remaining positions on the quantization grid Grid.

Next, Equation 9 means that 1, which is given by Equation 8, is shifted by an amount corresponding to the vertical shift parameter $SGQ_{shft2}$ in an interval corresponding to the depth interval parameter $SGQ_{dep}$.

Next, Equation 10 means that x-axis values among the values of the quantization function SG(i,j,z) have 1 at a first x-axis position on the quantization grid Grid and at positions thereon in an interval corresponding the horizontal interval parameter $SGQ_{hor}$ based on the first x-axis position, and have 0 at the remaining positions on the quantization grid Grid.

Next, Equation 11 means that 1, which is given by Equation 10, is shifted by an amount corresponding to the horizontal shift parameter $SGQ_{shft1}$ in an interval corresponding to the vertical interval parameter $SGQ_{ver}$.

At this point, the first quantization step value Q may be assigned to each of positions at which the value of the quantization function SG(i,j,z) is 1, and the second quantization step value Q-q may be assigned to each of the remaining positions.

Meanwhile, in the drawings, the first quantization step value Q is marked with X, and the second quantization step value Q-q is marked with •. Further, in the illustrated embodiment, the first and second quantization step values Q and Q-q are determined by setting the x-axis array number of the quantization grid Grid to 11, the y-axis array number thereof to 7, the z-axis array number thereof to 7, the horizontal interval parameter $SGQ_{hor}$ to 4, the vertical interval parameter $SGQ_{ver}$ to 3, the depth interval parameter $SGQ_{dep}$ to 3, the horizontal shift parameter $SGQ_{shft1}$ to 0 or 2, and the vertical shift parameter $SGQ_{shft2}$ to 0 or 2.

Figure 12B:
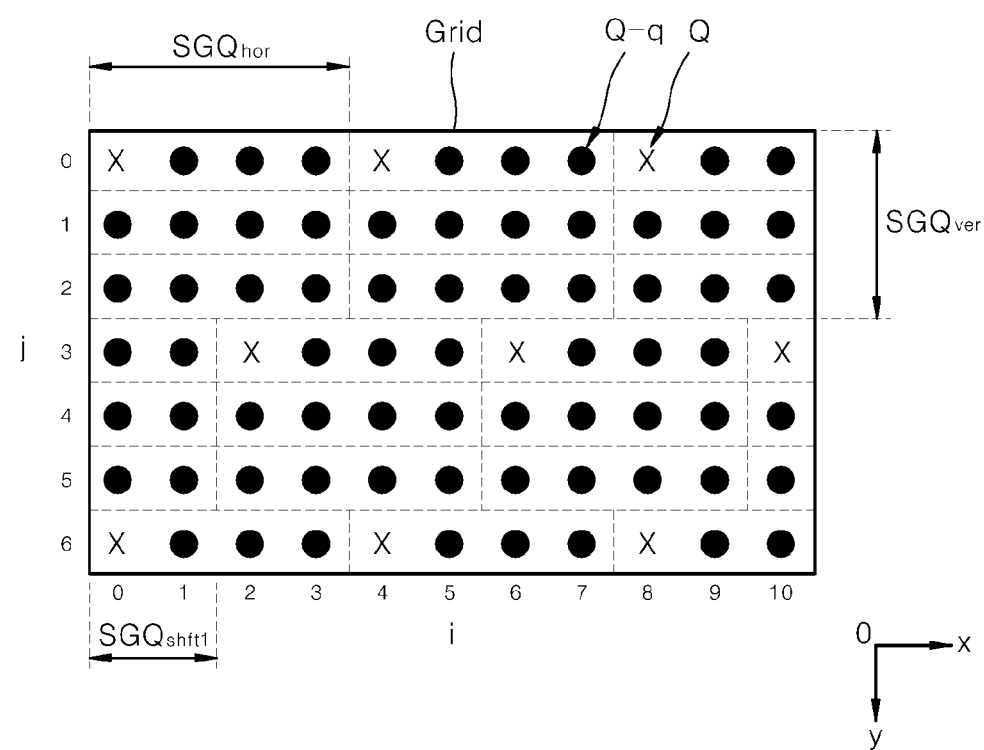
Figure 12C:
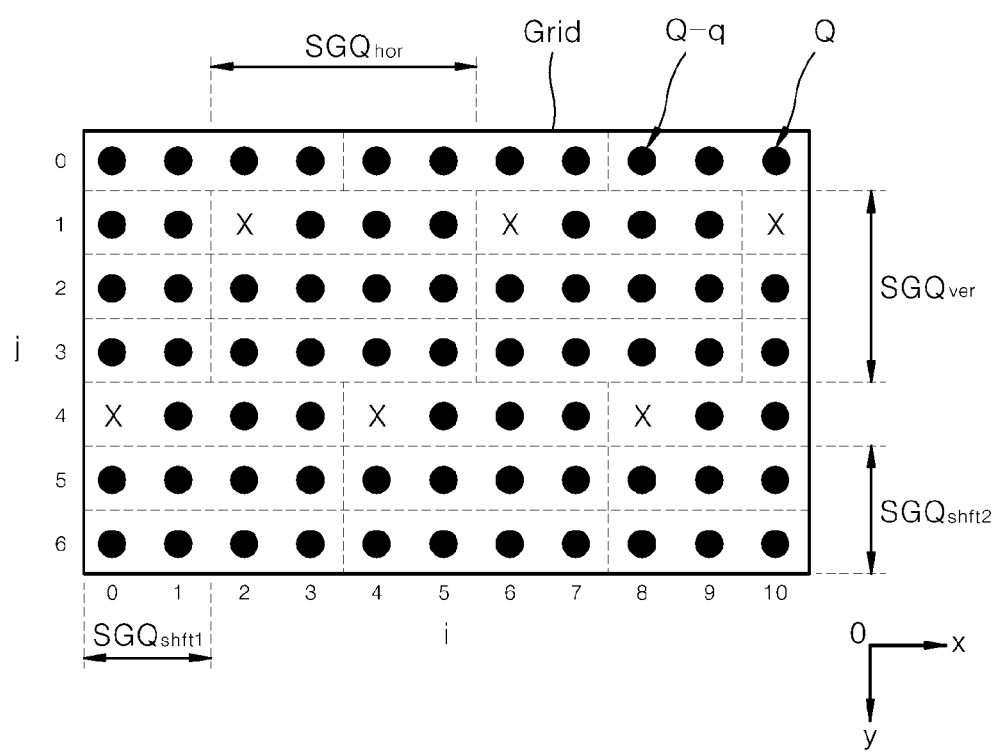

Here, FIGS. 10(A) to 10(C) show a case in which both the horizontal shift parameter $SGQ_{shft1}$ and the vertical shift parameter $SGQ_{shft2}$ are 0. Further, FIGS. 11(A) to 11(C) show a case in which the horizontal shift parameter $SGQ_{shft1}$ is not 0 and the vertical shift parameter $SGQ_{shft2}$ is 0. Also, FIGS. 12(A) to 12(C) show a case in which both the horizontal shift parameter $SGQ_{shft1}$ and the vertical shift parameter $SGQ_{shft2}$ are not 0.

Firstly, as shown in FIGS. 10(A) to 10(C), since both the horizontal shift parameter $SGQ_{shft1}$ and the vertical shift parameter $SGQ_{shft2}$ are 0, Equations 9 and 11 are not applied, and the value shft2 of the second shift function of Equation 0 and the value shft1 of the first shift function of Equation 11 become 0.

Here, when Equation 7 is applied, the value of the third quantization function $Fd(SGQ_{dep},z)$ becomes 1 at each of positions corresponding to z=0, 3, and 6, and it becomes 0 at each of the remaining positions. Further, when Equation 8, the value of the second quantization function $Fv(SGQ_{ver},shft2,j)$ becomes 1 at each of positions corresponding to j=0, 3, and 6 in case of z=0, 3, and 6, and it becomes 0 at each of the remaining positions. Also, when Equation 10 is applied, the value of the first quantization function $Fh(SGQ_{hor},shft1,i)$ becomes 1 at each of positions corresponding to i=0, 4, and 8 in case of j=0, 3, and 6, and it becomes 0 at each of the remaining positions.

When Equation 6 is applied, the value of the quantization function SG(i,j,z) becomes 1 at each of positions at which all the values of the first quantization function $Fh(SGQ_{hor},shft1,i)$, the second quantization function $Fv(SGQ_{ver},shft2,j)$, and the third quantization function $Fd(SGQ_{dep},z)$ are 1.

As shown in FIGS. 10(A) to 10(C), the first quantization step value Q may be assigned to each of positions at which the values of the quantization function SG(i,j,z) have 1, and the second quantization step value Q-q may be assigned to each of the remaining positions. Alternatively, the first and second quantization step values Q and Q-q may be assigned to positions and values contrary to the above description.

Consequently, the positions to which the quantization step values Q and Q-q are assigned on the quantization grid Grid of FIG. 10(B) are the same as those to which the quantization step values Q and Q-q are assigned on the quantization grid Grid of FIG. 10(C).

Next, in a case shown in FIGS. 11(A) to 11(C), since the vertical shift parameter $SGQ_{shft2}$ is 0 and the horizontal shift parameter $SGQ_{shft1}$ is not 0, Equation 11 is applied.

Here, when Equation 7 is applied, the value of the third quantization function $Fd(SGQ_{dep},z)$ becomes 1 at each of positions corresponding to z=0, 3, and 6, and it becomes 0 at each of the remaining positions.

When Equation 8 is applied, the value of the second quantization function $Fv(SGQ_{ver},shft2,j)$ becomes 1 at each of positions corresponding to j=0, 3, and 6 in case of z=0, 3, and 6, and it becomes 0 at each of the remaining positions. Further, when Equations 10 and 11 are applied, the value of the first quantization function $Fh(SGQ_{hor},shft1,i)$ becomes 1 at each of positions corresponding to i=0, 4, and 8 in case of j=0 and 6 and at each of positions corresponding to i=2, 6, and 10 in case of j=3, and it becomes 0 at each of the remaining positions.

Also, when Equation 6 is applied, the value of the quantization function SG(i,j,z) becomes 1 at each of positions at which all the values of the first quantization function $Fh(SGQ_{hor},shft1,i)$, second quantization function $Fv(SGQ_{ver},shft2,j)$, and the third quantization function $Fd(SGQ_{dep},z)$ are 1.

As shown in FIGS. 11(A) to 11(C), the first quantization step value Q may be assigned to each of positions at which the values of the quantization function SG(i,j,z) have 1, and the second quantization step value Q-q may be assigned to each of the remaining positions. Alternatively, the first and second quantization step values Q and Q-q may be assigned to positions and values contrary to the above description.

Consequently, the positions to which the quantization step values Q and Q-q are assigned on the quantization grid Grid of FIG. 11(B) are the same as those to which the quantization step values Q and Q-q are assigned on the quantization grid Grid of FIG. 11(C).

Further, the quantization grids Grid of FIGS. 11(A) to 11(C) are shifted by an amount corresponding to the horizontal shift parameter $SGQ_{shft1}$ in an interval corresponding to the vertical interval parameter $SGQ_{ver}$ compared to the quantization grids Grid of FIGS. 10(A) to 10(C). That is, a data loss due to the quantization may be spatially more distributed by an amount of the shifting.

Next, in a case shown in FIGS. 12(A) to 12(C), since both the vertical shift parameter $SGQ_{shft2}$ and the horizontal shift parameter $SGQ_{shft1}$ are not 0, Equations 9 and 10 are applied.

Here, when Equation 7 is applied, the value of the third quantization function $Fd(SGQ_{dep},z)$ becomes 1 at each of positions corresponding to z=0, 3, and 6, and it becomes 0 at each of the remaining positions.

When Equations 8 and 9 are applied, the value of the second quantization function $Fv(SGQ_{ver},shft2,j)$ becomes 1 at each of positions corresponding to j=0, 3, and 6 in case of z=0, and it becomes 0 at each of the remaining positions, and becomes 1 at each of positions corresponding to j=1, 4 in case of z=3, and it becomes 0 at each of the remaining positions, and becomes 1 at each of positions corresponding to j=2, 5 in case of z=6, and it becomes 0 at each of the remaining positions. Further, when Equations 10 and 11 are applied, the value of the first quantization function $Fh(SGQ_{hor},shft1,i)$ becomes 1 at each of positions corresponding to i=0, 4, and 8 in case of z=0 and j=0 and 6, at each of positions corresponding to i=2, 6, and 10 in case of z=0 and j=3, at each of positions corresponding to i=2, 6, and 10 in case of z=3 and j=1, and at each of positions corresponding to i=0, 4, and 8 in case of z=3 and 6 and j=4, and it becomes 0 at each of the remaining positions.

Also, when Equation 6 is applied, the value of the quantization function SG(i,j,z) becomes 1 at each of positions at which all the values of the first quantization function $Fh(SGQ_{hor}, shft1, i)$, second quantization function $Fv(SGQ_{ver}, shft2, j)$, and the third quantization function $Fd(SGQ_{dep}, z)$ are 1.

As shown in FIGS. 12(A) to 12(C), the first quantization step value Q may be assigned to each of positions at which the values of the quantization function SG(i,j,z) have 1, and the second quantization step value Q-q may be assigned to each of the remaining positions. Alternatively, unlike the drawings, the first and second quantization step values Q and Q-q may be assigned to positions and values contrary to the above description.

Consequently, the positions to which the quantization step values Q and Q-q are assigned on the quantization grid Grid of FIG. 12(B) are different from those to which the quantization step values Q and Q-q are assigned on the quantization grid Grid of FIG. 12(C).

Further, the quantization grids Grid of FIGS. 12(A) to 12(C) are shifted by an amount corresponding to the vertical shift parameter $SGQ_{shft2}$ in an interval corresponding to depth interval parameter $SGQ_{dep}$ compared to the quantization grids Grid of FIGS. 11(A) to 11(C). That is, a data loss due to the quantization may be spatially more distributed by an amount of the shifting.

As described above, in accordance with the present disclosure, the quantization step values Q and Q-q are assigned to the quantization grid Grid in a repetitive pattern using the quantization parameters $SGQ_{hor}$, $SGQ_{ver}$, $SGQ_{dep}$, $SGQ_{shft1}$, and $SGQ_{shft2}$, and the quantization function SG(i, j,z), such that it may be possible to prevent a data loss due to the compression of data, which is assigned to each of a plurality of pixels P arranged in a three dimensional array, from being concentrated on pixels P of specific positions. That is, in accordance with the present disclosure, the data loss due to the quantization may be spatially distributed.

Also, in accordance with the present disclosure, repetitive pattern intervals of the quantization step values are adjusted such that it may be possible to provide an optimum compression ratio of data, which is capable of minimizing a data loss. That is, a capacity of a memory for storing the compressed data may be reduced such that costs for employing a large capacity memory may be reduced.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings.

What is claimed is:

1. A method for compressing data assigned to each of a plurality of pixels arranged in an n dimensional array, wherein n is a natural number equal to or greater than 1, the method comprising:
   generating a quantization grid to which a quantization step value is assigned at positions thereon corresponding to positions of the plurality of pixels;
   assigning the quantization step value using a preset quantization parameter and a quantization function that is determined based on a size of the n dimensional array, wherein the quantization step value has two or more values different from each other;
   quantizing data, which is assigned to one of the plurality of pixels located at a position corresponding to a position of the quantization step value, using the quantization step value; and
   compressing the quantized data,
   wherein the quantization parameter includes a horizontal interval parameter and a vertical interval parameter when the plurality of pixels are arranged in a two dimensional array, and
   a first quantization step value is assigned to the quantization grid at each of positions thereon in an interval corresponding to the horizontal interval parameter and the vertical interval parameter, and a second quantization step value is assigned at remaining positions on the quantization grid.

2. The method of claim 1,
   wherein the quantization parameter further includes a horizontal shift parameter, and
   the first quantization step value is assigned to the quantization grid at each of positions thereon in an interval corresponding to the horizontal interval parameter in which the horizontal shift parameter is reflected and the vertical interval parameter.

3. A method for compressing data assigned to each of a plurality of pixels arranged in an n dimensional array, wherein n is a natural number equal to or greater than 1, the method comprising:
   generating a quantization grid to which a quantization step value is assigned at positions thereon corresponding to positions of the plurality of pixels;
   assigning the quantization step value using a preset quantization parameter and a quantization function that is determined based on a size of the n dimensional array, wherein the quantization step value has two or more values different from each other;
   quantizing data, which is assigned to one of the plurality of pixels located at a position corresponding to a position of the quantization step value, using the quantization step value; and
   compressing the quantized data,
   wherein the quantization parameter includes a horizontal interval parameter, a vertical interval parameter, and a depth interval parameter when the plurality of pixels are arranged in a three dimensional array, and
   a first quantization step value is assigned to the quantization grid at each of positions thereon in an interval corresponding to the horizontal interval parameter, the vertical interval parameter, and the depth interval parameter, and a second quantization step value is assigned at remaining positions on the quantization grid.

4. The method of claim 3,
   wherein the quantization parameter further includes a horizontal shift parameter, and
   the first quantization step value is assigned to the quantization grid at each of positions thereon in an interval corresponding to the horizontal interval parameter in which the horizontal shift parameter is reflected, the vertical interval parameter, and the depth interval parameter.

5. The method of claim 3,
   wherein the quantization parameter further includes a horizontal shift parameter and a vertical shift parameter, and the first quantization step value is assigned to the quantization grid at each of positions thereon in an interval corresponding to the horizontal interval parameter in which the horizontal shift parameter is reflected, the vertical interval parameter in which the vertical shift parameter is reflected, and the depth interval parameter.

6. A display device for compressing data assigned to each of a plurality of pixels arranged in an n dimensional array, wherein n is a natural number equal to or greater than 1, the display device comprising:
  a grid generation unit that generates a quantization grid to which a quantization step value is assigned at positions thereon corresponding to positions of the plurality of pixels;
  a quantization unit that assigns the quantization step value using a preset quantization parameter and a quantization function that is determined based on a size of the n dimensional array, wherein the quantization step value has two or more values different from each other, and quantize data, which is assigned to one of the plurality of pixels located at a position corresponding to a position of the quantization step value, using the quantization step value; and
  an encoder that compresses the quantized data,
  wherein the quantization parameter includes a horizontal interval parameter and a vertical interval parameter when the plurality of pixels are arranged in a two dimensional array, and
  a first quantization step value is assigned to the quantization grid at each of positions thereon in an interval corresponding to the horizontal interval parameter and the vertical interval parameter, and a second quantization step value is assigned at remaining positions on the quantization grid.

7. The display device of claim 6, wherein the quantization parameter further includes a horizontal shift parameter, and
  the first quantization step value is assigned to the quantization grid at each of positions thereon in an interval corresponding to the horizontal interval parameter in which the horizontal shift parameter is reflected and the vertical interval parameter.

8. A display device for compressing data assigned to each of a plurality of pixels arranged in an n dimensional array, wherein n is a natural number equal to or greater than 1, the display device comprising:
  a grid generation unit that generates a quantization grid to which a quantization step value is assigned at positions thereon corresponding to positions of the plurality of pixels;
  a quantization unit that assigns the quantization step value using a preset quantization parameter and a quantization function that is determined based on a size of the n dimensional array, wherein the quantization step value has two or more values different from each other, and quantize data, which is assigned to one of the plurality of pixels located at a position corresponding to a position of the quantization step value, using the quantization step value; and
  an encoder that compresses the quantized data,
  wherein the quantization parameter includes a horizontal interval parameter, a vertical interval parameter, and a depth interval parameter when the plurality of pixels are arranged in a three dimensional array, and
  a first quantization step value is assigned to the quantization grid at each of positions thereon in an interval corresponding to the horizontal interval parameter, the vertical interval parameter, and the depth interval parameter, and a second quantization step value is assigned at remaining positions on the quantization grid.

9. The display device of claim 8, wherein the quantization parameter further includes a horizontal shift parameter, and
  the first quantization step value is assigned to the quantization grid at each of positions thereon in an interval corresponding to the horizontal interval parameter in which the horizontal shift parameter is reflected, the vertical interval parameter, and the depth interval parameter.

10. The display device of claim 8, wherein the quantization parameter further includes, a horizontal shift parameter and a vertical shift parameter, and
  the first quantization step value is assigned to the quantization grid at each of positions thereon in an interval corresponding to the horizontal interval parameter in which the horizontal shift parameter is reflected, the vertical interval parameter in which the vertical shift parameter is reflected, and the depth interval parameter.

* * * * *